United States Patent [19]

Matsumoto et al.

[11] Patent Number: 4,759,321
[45] Date of Patent: Jul. 26, 1988

[54] VALVE TIMING ARRANGEMENT FOR INTERNAL COMBUSTION ENGINE HAVING MULTIPLE INLET VALVES PER CYLINDER

[75] Inventors: Yasuo Matsumoto, Yokohama; Seinosuke Hara, Yokosuka; Hiromichi Ofuji, Yokohama, all of Japan

[73] Assignee: Nissan Motor Co., Ltd., Yokohama, Japan

[21] Appl. No.: 877,523

[22] Filed: Jun. 23, 1986

[30] Foreign Application Priority Data

Jun. 24, 1985 [JP]  Japan ................. 60-137472
Jun. 28, 1985 [JP]  Japan ................. 60-143100
Jul. 22, 1985 [JP]  Japan ................. 60-162266

[51] Int. Cl.⁴ ............................... F01L 1/34
[52] U.S. Cl. ......................... 123/90.15; 123/90.27
[58] Field of Search ............. 123/90.15, 90.16, 90.22, 123/90.23, 90.27, 90.31, 90.39, 90.42, 90.44, 90.55, 432

[56] References Cited

U.S. PATENT DOCUMENTS

| | | | |
|---|---|---|---|
| 4,285,310 | 8/1981 | Takizawa et al. | 123/90.16 |
| 4,539,951 | 9/1985 | Hara et al. | 123/90.27 |
| 4,552,112 | 11/1985 | Nagao et al. | 123/432 |
| 4,570,590 | 2/1986 | Kawai et al. | 123/90.16 |

FOREIGN PATENT DOCUMENTS 58-25537  2/1983  Japan .

OTHER PUBLICATIONS

"Motor Fan" Magazine, Mar. 1985 Issue.

Primary Examiner—Charles J. Myhre
Assistant Examiner—David A. Okonsky
Attorney, Agent, or Firm—Foley & Lardner, Schwartz, Jeffery, Schwaab, Mack, Blumenthal & Evans

[57] ABSTRACT

At least one of two inlet valves provided per cylinder of a multi-cylinder internal combustion engine is operated using a variable valve timing device. This device is controlled in response to the load and rotational speed of the engine in a manner which reduces the lift of the valve at low engine speeds and stepwisely increases the same as the engine moves from one mode of operation to the other. In the event that only one valve is controlled this valve is selected to be the one other than that which generates swirl in the combustion chamber.

14 Claims, 20 Drawing Sheets

| LIFT | |
|---|---|
| a — | 2.0 mm |
| b — | 5.0 mm |
| c — | 8.0 mm |
| d — | 8.0 mm |
| e — | 9.4 mm |
| f — | 10.8 mm |

| LIFT | |
|---|---|
| a — | 0.5 mm |
| b — | 2.0 mm |
| c — | 5.0 mm |
| d — | 8.0 mm |
| e — | 9.4 mm |
| f — | 10.8 mm |

FIG.15
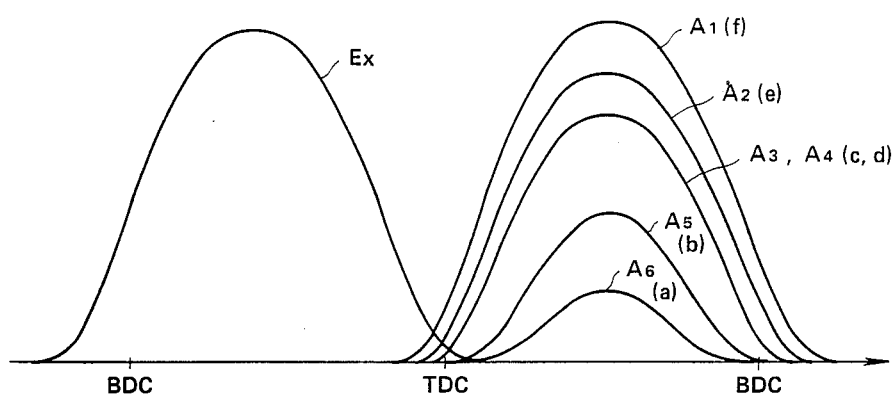
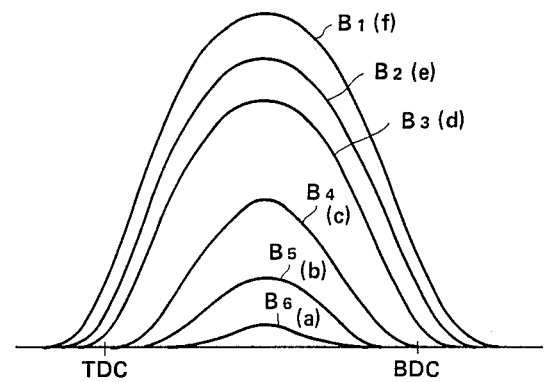
FIG.16
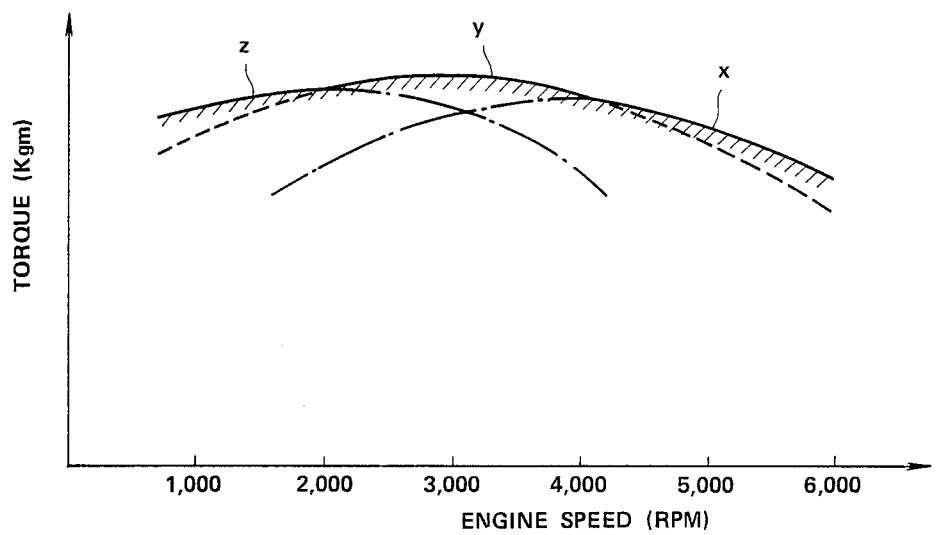

(IDLING)
(a) LOBES (LOW SPEED — LOW LOAD)
(b) LOBES (INTERMEDIATE SPEED — LOW/INTERMEDIATE LOAD)
(c) LOBES (LOW SPEED — HIGH LOAD)
(d) LOBES (INTERMEDIATE SPEED — HIGH LOAD)
(e) LOBES (HIGH SPEED — HIGH LOAD)
(f) LOBES

| LIFT | |
|---|---|
| a — | 1.0 mm |
| b — | 4.5 mm |
| c — | 8.0 mm |
| d — | 8.0 mm |
| e — | 8.0 mm |

| LIFT | |
|---|---|
| a — | 0.5 mm |
| b — | 3.0 mm |
| c — | 8.0 mm |
| d — | 9.4 mm |
| e — | 10.8 mm |

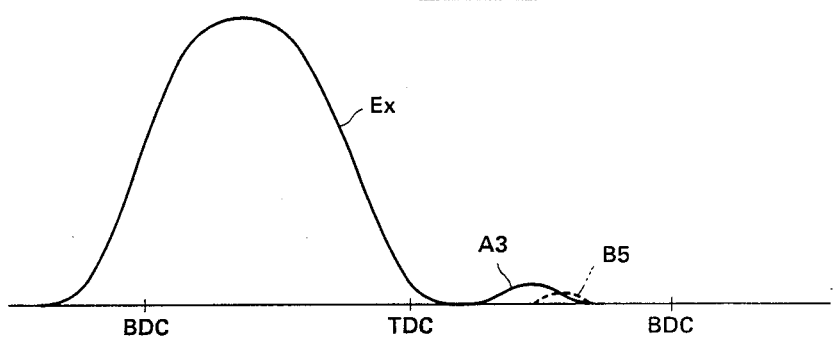
FIG.31 (IDLING) (a) LOBES
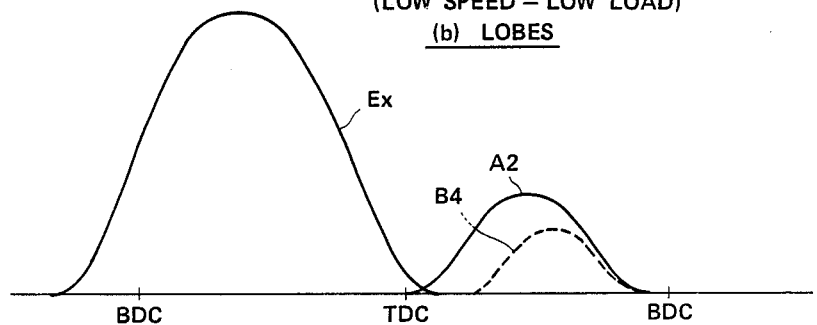
FIG.32 (LOW SPEED – LOW LOAD) (b) LOBES
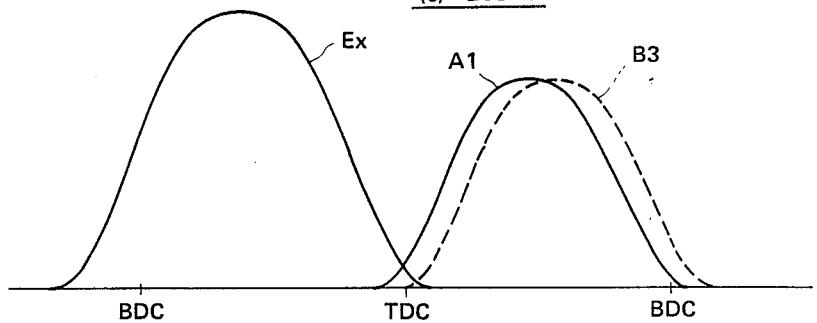
FIG.33 (c) LOBES

| LIFT | |
|---|---|
| a — | 1.0 mm |
| b — | 4.5 mm |
| c — | 8.0 mm |
| d — | 9.4 mm |
| e — | 10.8 mm |

(a) LOBE (b) LOBE (c) LOBE (d) LOBE (e) LOBE

VALVE TIMING ARRANGEMENT FOR INTERNAL COMBUSTION ENGINE HAVING MULTIPLE INLET VALVES PER CYLINDER

BACKGROUND OF THE INVENTION

1. Field of the Invention

The present invention relates generally to an internal combustion engine and more specifically to a multi-cylinder internal which has more than one inlet valve per combustion chamber and which is equipped with a variable valve timing control device which controls at least one of the inlet valves.

2. Description of the Prior Art

FIGS. 1 to 5 show an internal combustion engine disclosed in Japanese Patent First Provisional Publication No. 58-25537(1983) which is equipped with a dual induction system and two inlet valves per combustion chamber.

This engine is arranged so that the charge inducted through the first or primary induction system 1 is delivered into each cylinder through a first or primary inlet valve 2 in a manner which promotes a swirling flow pattern in the combustion chamber. The primary induction system 1 is designed to function efficiently during low engine speed modes of operation (see trace A in FIG. 5). This ensures stable operation during idling and the like.

The fresh charge inducted through the secondary induction arrangement 4 is introduced into the combustion chambers via secondary inlet valves 6. The port arrangements 8 associated with each of the secondary inlet valves 6 are larger in cross-section than those associated with the corresponding primary inlet valves 2 and are arranged to provide good charging efficiency rather than swirl.

Each cylinder is provided with a single exhaust valve 10 which is located as shown in FIG. 1, opposite the primary inlet valve 2.

Each of the exhaust and the inlet is operated by a rocker arm arrangement which includes a mechansim 12 which permits each valve to be selectively enabled or disabled.

Under low load-low speed operation all of the valves are disabled while under high load-low speed only the secondary inlet valves 2 are rendered inoperative.

FIGS. 3 and 4 show the valve lift control mechanism 12 which enables the selective disablement.

This mechanism includes a fork-like stopper arrangement 14 which is selectively movable under the influence of hydraulic pressure supplied to a control chamber 16. When it is desired to disable the valve associated therewith the hydraulic pressure in the control chamber 16 is relieved and the stopper member 14 permitted to move back away from a valve tappet 18 under the influence of a return spring 20. This retractive movement unlocks a tappet arrangement 18 and allows a plunger 22 thereof to reciprocate in and out of the main body 24 of the device and thus prevent the motion of the rocker arm 26 from being transmitted to the associated valve. The spring 20 of the tappet arrangement is weaker than the valve spring and thus maintains contact between the tip of the plunger 22 and the top of the valve stem without inducing any lift.

When it is desired to re-enable the disabled valve, hydraulic pressure is supplied to the control chambers 16 through a passage structure which includes an elongate coaxial bore 28 formed in the rocker arm shaft 30 and a branch runner 32 formed in the rocker arms per se. This drives the stopper forward into a position wherein it locks the plunger in position in the main body 24.

Fuel is supplied to the engine exclusively through the primary induction system 1. However, due to the on/off nature of the control which occurs with the enablement/disablement of the valves, in order to adequately control the A/F ratio of the air-fuel mixture actually fed to the combustion chambers it is necessary to use first and second fuel injectors 34, 35 in the SPI (single point injection) arrangement disposed upstream of the primary throttle valve 36. For example, upon enablement or disablement of the secondary inlet valves 6 the sudden change in induction volume is controlled by initiating or terminating the operation of one of the fuel injectors. However, this induces the drawback that the fuel supply system becomes complex and expensive.

With this type of engine system the primary induction system 1 is designed to function efficiently at low engine speeds wherein combustion stablity tends to be a problem while the secondary system 4 is designed to enable the production of large amount of power during high speed operation. If the secondary system 4 is not designed particularly for use at high engine speed it becomes impossible to develop the required amount of power under such conditions.

Thus, because the primary induction system 1 must be tailored to the needs of low speed operation and the secondary one to the needs of high engine speed operation a further drawback is encounted in that, as graphically illustrated in FIG. 5, during the transition between low and high speed operation a "flat spot" wherein the torque generation tends to fall off in the 2,500–4000 RPM region is produced. This deteriorates engine performance in this region.

SUMMARY OF THE INVENTION

It is an object of the present invention to provide a valve control arrangement which obviates the above mentioned "flat spot" in the engine torque generation characteristics during transitions between low and high speed operation by selectively varying the lift and timing of one or more of the multiple inlet valves employed per cylinder.

In brief, the above object is achieved by an arrangement wherein at least one of two inlet valves provided per cylinder of a multi-cylinder internal combustion engine, is operated using a variable valve timing device. This device is controlled in response to the load and rotational speed of the engine in a manner which reduces the lift of the valve at low engine speeds and stepwisely increases the same as the engine moves from one mode of operation to the other. In the event that only one valve is controlled this valve is selected to be the one other than that which generates swirl in the combustion chamber.

More specifically, a first aspect of the present invention takes the form of an internal combustion engine which is characterized by: a combustion chamber; an exhaust valve which controls communication between the combustion chamber and an exhaust system; a first inlet valve which controls communication between the combustion chamber and a first induction passage which is so constructed and arranged as to guide the air which flows therethrough into the combustion chamber in a manner to establish a swirling air pattern therein; a second inlet valve which controls communication between the combustion chamber and a second induction passage which is so constructed and arranged as to introduce the air flowing therein into the combustion chamber in a manner which promotes charging efficiency; a variable valve timing arrangement which controls the lift and timing of the second inlet valve; and a control device for controlling the first variable valve timing arrangement in response to engine operation.

A second aspect of the present invention comes in the form of a method of controlling an internal combustion engine which comprises the steps of: controlling the communication between a combustion chamber of the engine and an exhaust system thereof using an exhaust valve; using a first inlet valve to control communication between the combustion chamber and a first induction passage; arranging the first induction passage to guide the air which flows therethrough into the combustion chamber in a manner to establish a swirling air pattern therein; using a second inlet valve to control communication between the combustion chamber and a second induction passage; arranging the second induction passage to introduce the air flowing therein into the combustion chamber in a manner which promotes charging efficiency; controlling the second inlet valve using a first variable valve timing arrangement which controls the lift and timing of the second inlet valve; and using a control device to control the first variable valve timing arrangement in accordance with a first operational parameter of the engine.

A further notable feature of the present invention comes in controlling the first variable valve timing arrangement using a control schedule which is defined in terms of the first and second engine operational parameters and which is divided into a plurality of operational zones, controlling the operation of a motor which controls a first control cam of the first variable valve timing arrangement in response to a transition of engine operation from one zone to another which is induced by an increase in the magnitude of one or both of the first and second parameters so as to promptly energize the motor in a manner which rotates the first control cam in a rotational direction which increases the lift of the second inlet valve, and controlling the operation of the motor in response to a transition from one operational zone to another which is induced by a reduction in the magnitude of one or both of the first and second parameters so as to delay the energization of the motor in a manner which rotates the first control cam in a rotational direction which decreases the lift of the second inlet valve.

BRIEF DESCRIPTION OF THE DRAWINGS

FIG. 15 is a graph showing the lift characteristics of the exhaust valve, primary inlet valve and secondary inlet valve according to a first embodiment of the present invention;

FIG. 16 is a graph showing in terms of engine torque and engine speed the torque generation characteristics achieved with the first embodiment of the present invention;

FIGS. 31 to 35 show individually the valve lift control which is achieved as each of the control cams shown in FIGS. 29 and 30 are rotated through their five operative positions;

DETAILED DESCRIPTION OF THE PREFERRED EMBODIMENTS

FIGS. 6 to 13 show the construction and arrangement of a first embodiment of the present invention which in this instance is applied to a four cylinder four cycle inline engine.

Figure 8:
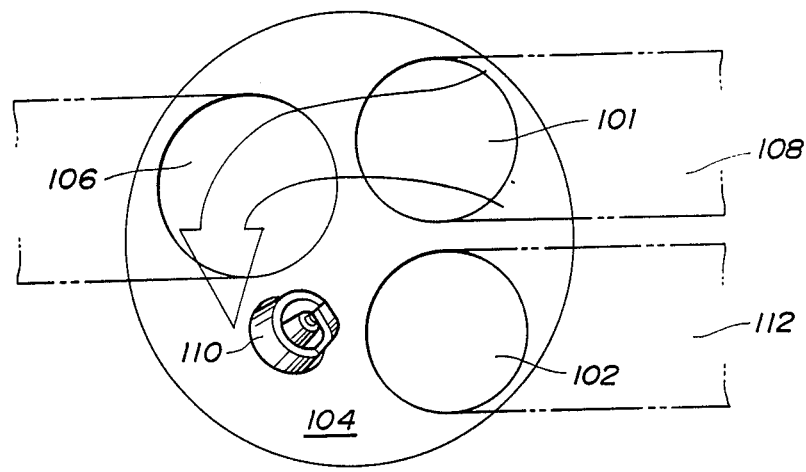
FIG. 8 is a plan view of the lower face of the cylinder head shown in FIG. 6 showing the valve arrangement of the engine to which the present invention is applied.

As best seen in FIG. 8, the valves of the engine valve train are arranged in the cylinder head 100 so that both inlet valves 101, 102 are located on the same side of the combustion chamber 104 while the exhaust valve 106 is located essentially opposite the primary inlet valve 101. The primary inlet port 108 is arranged to introduce the incomming charge into the combustion chamber 104 tangentially with respect the cylinder axis (not shown) and with a strong flow component in a plane normal to said axis and thus in a manner to swirl in a manner essentially as indicated by the bold arrow. The spark plug 110 is located so as to be essentially in the path of the swirling charge pattern. In this engine the spark plug 110 is located downstream of the exhaust valve 106 with respect to the direction of the swirl and in a position which is relatively remote from the primary inlet valve 101 and essentially opposite the secondary inlet one 102.

The secondary induction port 112 is arranged to have a cross-section which is larger than that of the primary induction port 108 and to promote efficient charging efficiency.

Figure 2:
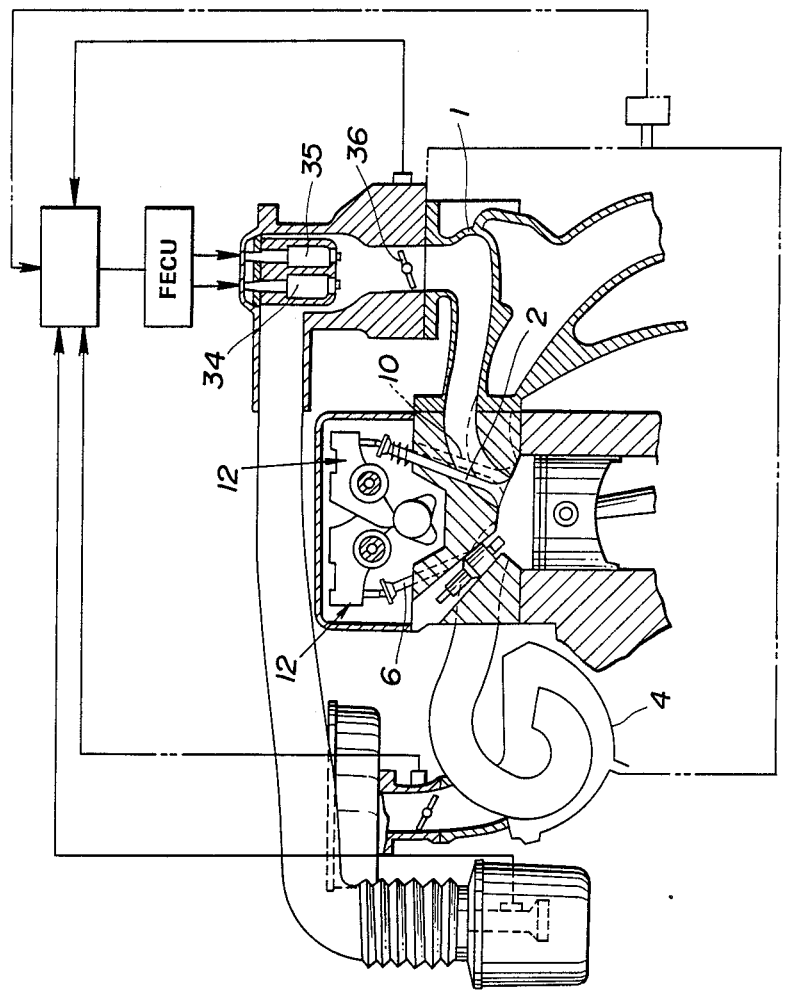
FIG. 2 is a elevation (partially in section) showing the engine of FIG. 1.
Figure 3:
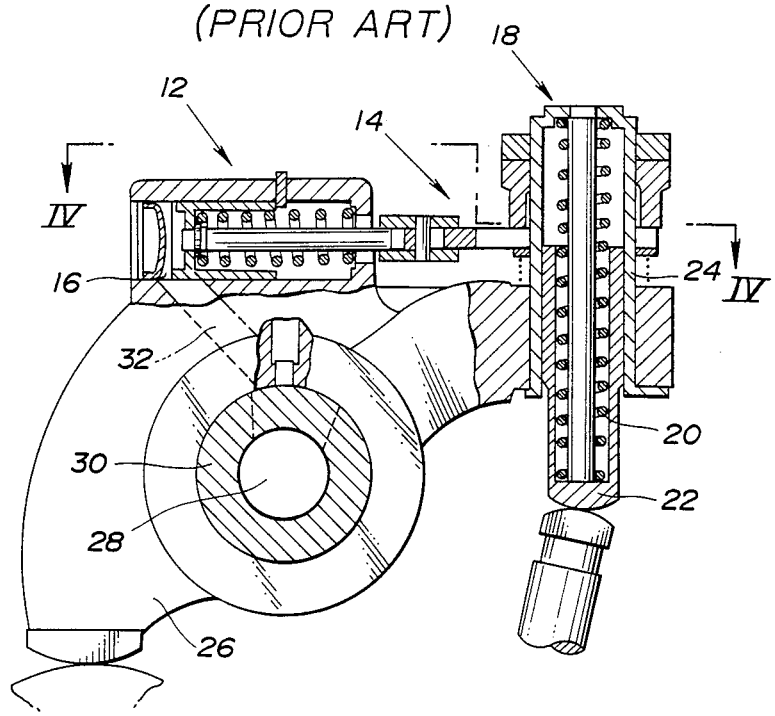
FIGS. 3 and 4 are side elevation and plan views of the valve control arrangement by which the operation of each of the valves of the engine shown in FIG. 1 can be selectively disabled.
Figure 4:
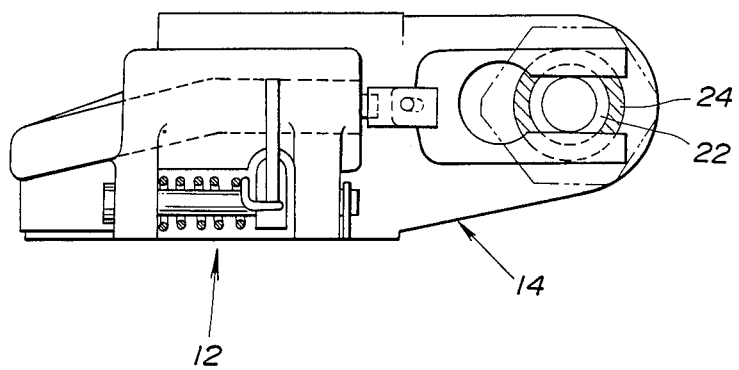
Figure 5:
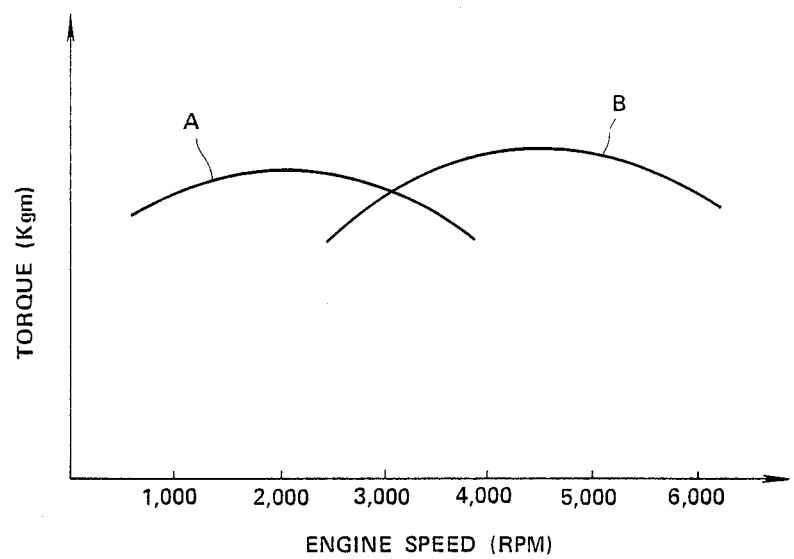
FIG. 5 is a graph showing in terms of engine torque and engine speed, the torque generation characteristics of the FIG. 1 engine.
Figure 6:
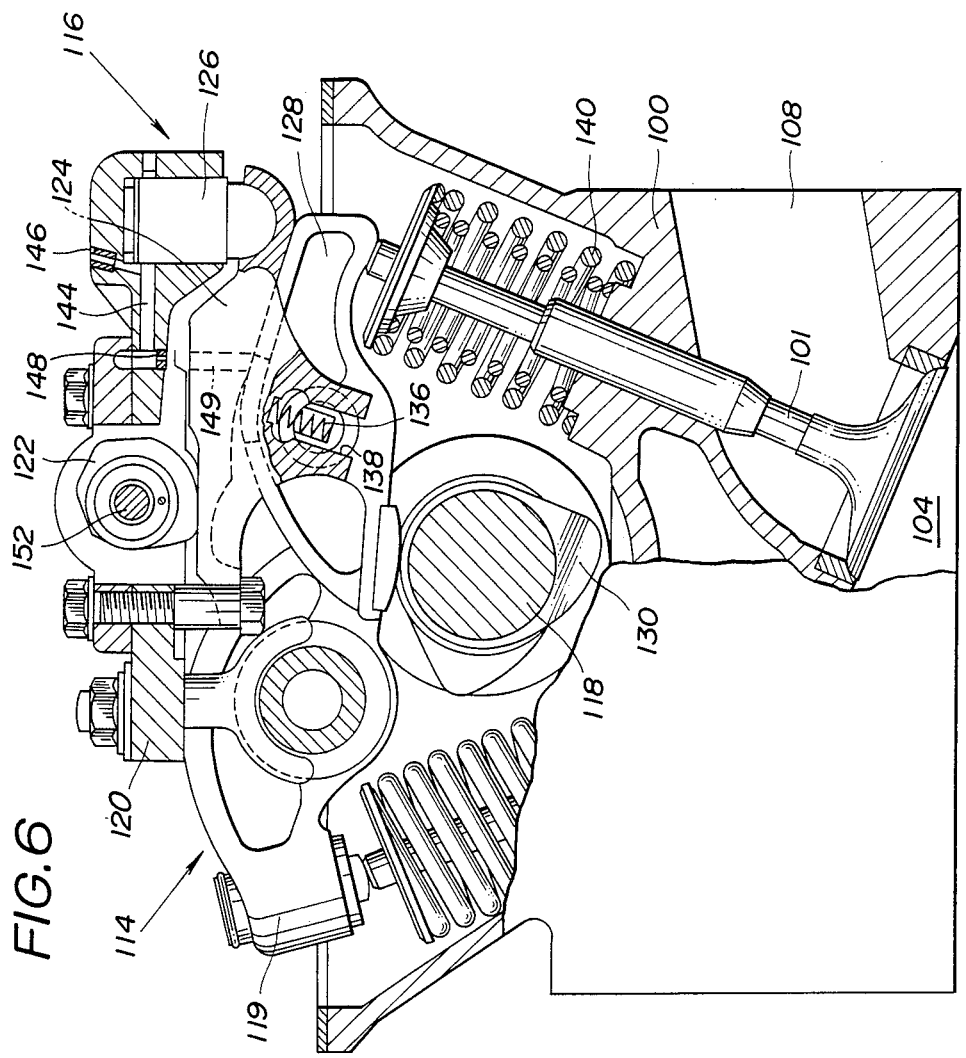
FIG. 6 is a sectional elevation of a valve control arrangement which characterizes the present invention.
Figure 7:
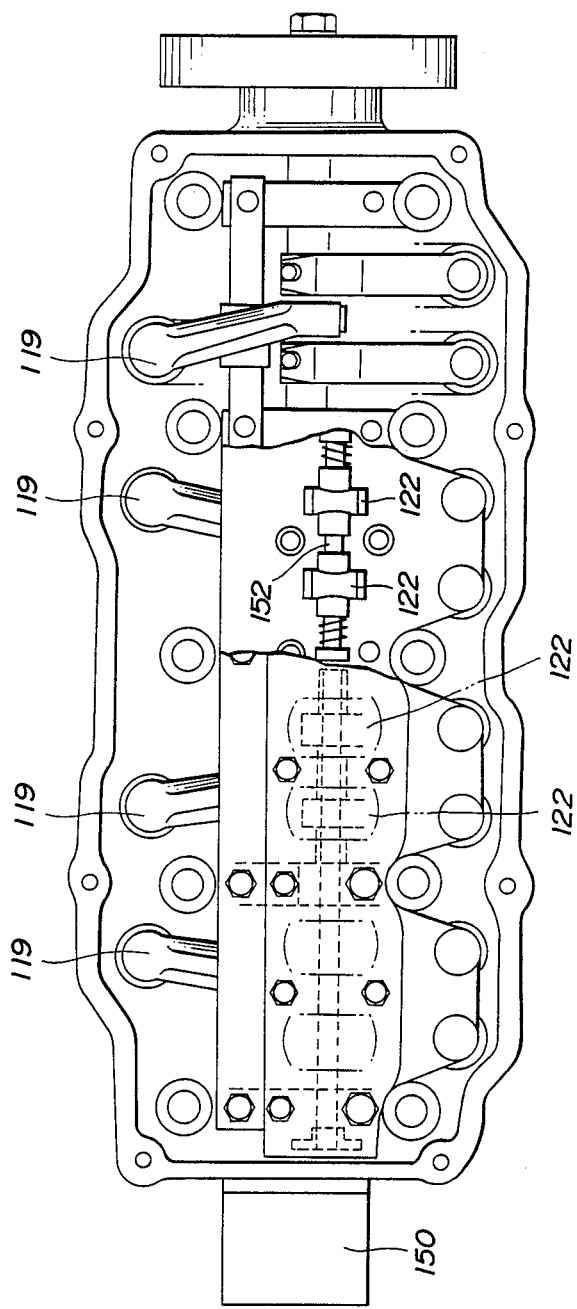
FIG. 7 is a plan view of the mechanism shown in FIG. 6.

In the arrangement shown in FIG. 2, the exhaust valve 106 is arranged to be lifted by a rocker arm arrangement 114 which exhibits fixed lift/timing characteristics while both (only the primary inlet valve is shown in FIG. 6) are arranged to be lifted by an arrangement 116 which can vary the lift/timing characteristics thereof.

In this embodiment all of the inlet and the exhaust valve "drive" cams are mounted on a common cam shaft 118 thus permitting a overall simplification of the valve gear train and cylinder head structure.

The exhaust valve rocker arm 119 is suitably supported on a cylinder bracket 120. As the construction and arrangement of this portion of the valve train is such as to produce fixed lift characteristics and will be obvious to those skilled in the automotive engine art, no further disclosure is deemed necessary.

The VVT (variable valve timing) arrangements by which the primary and secondary inlet valves are controlled each comprise a multi-lobe control cam 122, a reaction lever 124 which engages the cam 122 at one end and which is pivotally mounted on a hydraulic tappet 126 at the other end; and a rocker arm 128 which is engageable with the lower surface of the reaction lever 122. Each rocker arm 128, as shown, is engageable with a single lobe "drive" cam 130 at one end and with the top of an inlet valve stem at the other. In FIG. 6 only the primary inlet valve 101 is shown.

It will be noted that for clarity of disclosure that the term "drive" will be applied to the single lobe cams 130 which are continously rotated and which serve as the source of motive energy for the rocker arms 128, while the selectively rotatable multi-lobe cams 122 are referred to as "control" cams.

Figure 11:
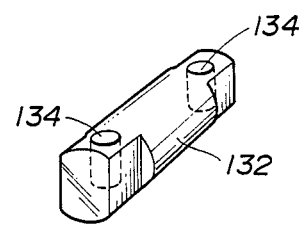
FIG. 11 is a pespective view showing a shaft on which the rocker arms of the variable valve timing device shown in FIG. 6 are supported.

The rocker arms 128 which operate the primary and secondary inlet valves 101, 102 of each cylinder are each pivotally supported on a shaft 132. This shaft 132 is disposed through a suitable bore formed in the respective rocker arm and arranged (as shown in FIG. 11) to have a pair of blind bores 134 for receiving the lower ends of spings 136. This shaft is also formed with parallel flat surfaces or "flats" on the ends thereof. These end sections of the shaft 132 are slidably received in elongate slots 138 formed in the reaction levers which depend down either side of the rocker arm associated therewith. The springs 136 bias the rocker arms 128 into engagement with the drive cams 130 and inlet valve stems. These springs 136 have a spring constant which is far weaker than that of the valve springs 140 and thus do not exert sufficient force to influence the lifting of the valves.

Each of the hydraulic tappets 126 is supplied hydraulic fluid under pressure through a series of bores (generally denoted by the numeral 144) formed in the cylinder head bracket 122. The fluid pumped into the passage structure is relieved through orifices 146, 148. As shown, some of these orifices 148 are arranged to discharge fluid into a through bores 149 formed in the reaction levers so as to supply lubricant to the surfaces of the reaction levers 124 and the rocker arms 128 which contact each other during operation of the engine.

The size of the orifices 146, 148 and the construction of the tappets 126 are selected to maintain a zero clearance between the rocker arms 128 and the top of the inlet valve stems.

During operation, as the cam shaft 118 rotates the inlet valve cam lobes induce the rocker arms 128 to move toward the reaction levers 124 until elbow-like sections thereof engage the lower surface of the reaction levers thus establishing a fulcrum. Following this the reaction between the levers 124 and the rocker arms 128 induces the latter to pivot in a manner which moves the inlet valves against their corresponding valve springs 140.

By varying the rotational position of the respective control cams 122 the angle of the reaction levers can be varied in a manner which varies the time at which the elbows of the rocker arms 128 contact the lower surfaces of the reaction lever 124 and begins to initiate valve lift. The shapes or profiles of the drive cams 130 determines the basic lift and timing characteristics of the inlet valves. Selective rotation of the control cams 122 permits a large scale variation in this basic control as will become clear hereinlater.

The lower surfaces of the reaction levers against which the rocker arms 128 engage are contoured as shown. By selecting curvature of this contour the timing of the lift can be modified. The surfaces of the reaction lever 124 and the rocker arms 128 which engage each other are flat to define a line contact. The position of this line moves as the rocker arms "rolls along" the reaction levers 124 until the elbow of the rocker arms 128 make contact and the valve lifting operation per se begins.

Rotation of the control cams 122 in this embodiment is controlled by a single servo which in this instance takes the form of a stepping motor 150. As will be noted from FIG. 7 all of the control cams 122 are disposed on a single control shaft 152. This in combination with the single cam shaft 118 on which the inlet and exhaust "drive" cams are disposed enables a simple cylinder head construction.

Figure 14:
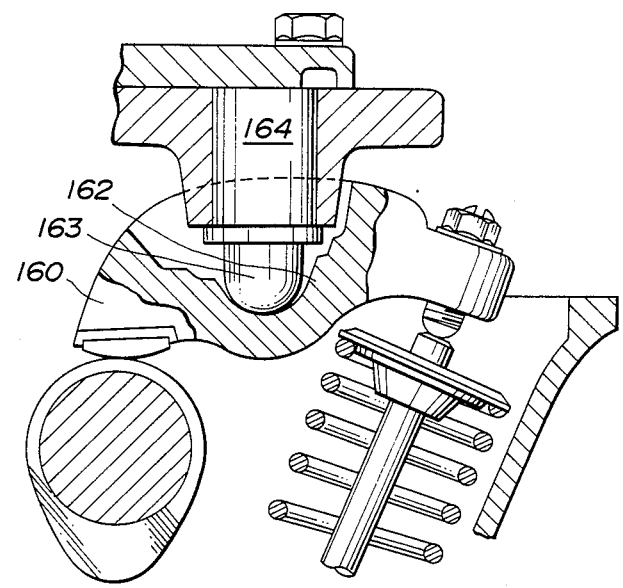
FIG. 14 shows an alternative rocker arm arrangement with can used to operated the exhaust valve (or the primary inlet valve in the event that the latter is not intended to undergo variable lift/timing)

FIG. 14 shows the construction of a rocker arm arrangement which can be used in lieu of the apparatus used in the arrangement of FIG. 6 to operate the exhaust valve and/or the one of the primary or secondary inlet valves in the instance that it is deemed unnecessary to vary both of the inlet valve lift and timing.

In this arrangement the rocker arm 160 is formed with a curved concave recess 162 in which the rounded nose-like tip 163 of a hydraulic tappet 164 is received. This tappet is supplied hydraulic pressure in a manner similar to the tappet used in the FIG. 6 arrangement. In this case also it is necessary to ensure that hydraulic fluid can be readily introduced into the tappet but discharged only slowly to ensure that the length of the device is not reduced by compression during engine operation which causes a reduction in the required amount of valve lifting.

Figure 9:
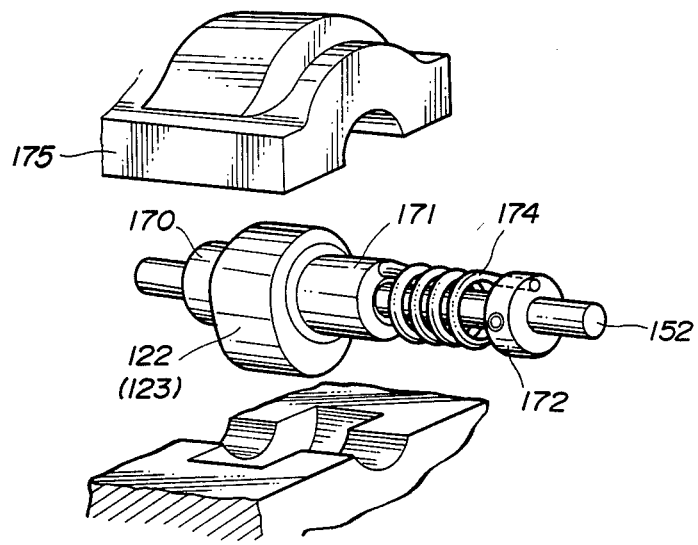
FIG. 9 is a partially exploded pespective view showing in detail the construction of a cam device which controls the timing and lift of the inlet valves in accordance with the present invention.
Figure 10:
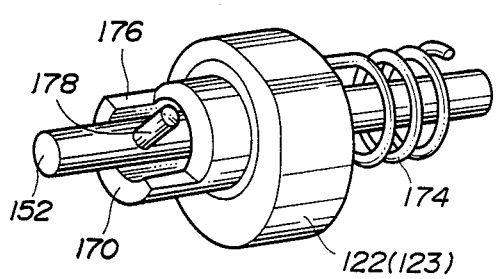
FIG. 10 is a second perspective view of the control cam arrangement shown in FIG. 9.

FIGS. 9 and 10 shows constructional details of the control cams 122. As shown, the cams are each arranged to be rotatably disposed on the control shaft 152 and to have cylindrical boss-like sections 170, 171 which extend from either side thereof. A holder 172 is fixed to the control shaft 152 and interconnected with the cam body by a coil spring 174. This spring 174 is disposed about the shaft 152 as shown. A cap member 175 is formed to cover the cam and is recessed in a manner which permits free rotation of the same.

As best seen in FIG. 10 one of the cylindrical sections is formed with a cut-out 176. A stopper pin 178 formed on the control shaft 152 is arranged to extend into the cut-out. Upon a given amount of rotation the pin 178 engages the cylindrical portion 170 and positively drives the cam to rotate with the control shaft 152. This arrangement defines a lost motion connection which eliminates the need to make the spring 174 excessively strong while enabling smooth switching of the cam from one setting to another. During any relative rotation between the control shaft 152 and the cam the spring develops tension which tends to rotate the cam in the required direction. Upon the rocker arm assuming a non-lift state the cam tends to rotate under the influence of the tension which has built up.

For further disclosure relating to this type of VVT mechanism reference may be had to U.S. Pat. No. 4,539,951 issued on Sept. 10, 1985 in the name of Hara et al. The content of this document is hereby incorporated by reference thereto.

Figure 12:
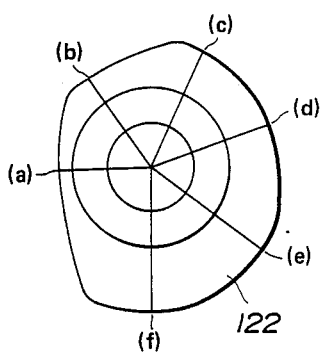
FIGS. 12 and 13 show the profiles of the control cams used to vary the lift of the primary and secondary inlet valves according to the present invention.
Figure 13:
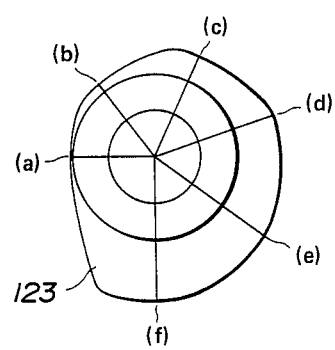

FIGS. 12 and 13 show the profiles of the primary and secondary inlet valve control cams respectively. Each of these cams are formed with 6 cam surfaces or lobes. By way of example with the primary inlet valve control cam 122, cam surfaces a-f may produce lifts of 2 mm, 5 m, 8 mm, 8 mm, 9.4 mm and 10.8 mm respectively while the corresponding surfaces on the secondary lift control cam 123 produce 0.5 mm, 2 mm, 5 mm, 8 mm, 9.4 mm and 10.8 mm respectively.

With the above described arrangement during high speed operation for example the cams are rotated so that cam surfaces 122f and 123f engage the respective reaction levers in a manner to produce the maximum lift characteristics while at the other extreme of engine operation (i.e. idling) the cams are rotated to induce the minimum and/or suitably small amount of lift.

FIG. 15 shows in graphical form the lift characteristics possible with the first embodiment of the present invention. In this graph C denotes the lift timing of the exhaust valve which as shown is fixed. A and B denote the lift of the primary and secondary inlet valves respectively. Traces A6 to A1 denote the lift characteristics using cam surfaces a-f of cams 122 while traces B6-B1 denote the lift characteristics induced by cam surfaces a-f of cams 123.

When the engine is operating under intermediate engine speed-high load conditions, by rotating the control cams so that lobes 122e and 123e engage the reactions levers and move same to the appropriate positions the inlet valves are lifted in accordance with the traces A2 and B2 shown in FIG. 15 and the torque developed by the engine varies as denoted by trace Y in FIG. 16.

Figure 1:
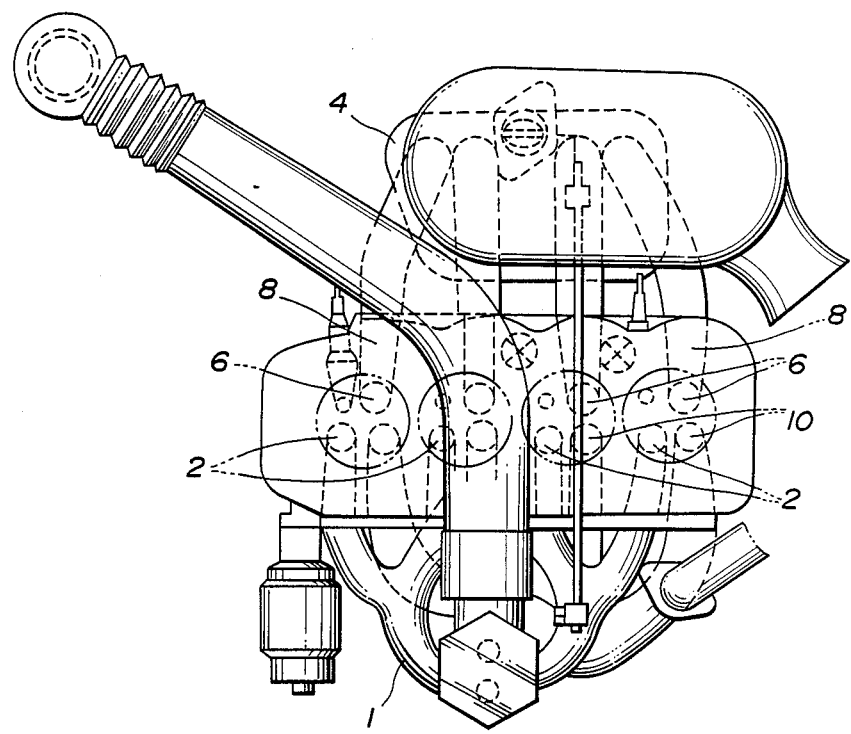
FIG. 1 is a plan view of the engine discussed in the opening paragraphs of the instant disclosure.

As will be appreciated from this graph, the flat spot wherein inadequate torque is produced by the prior art engine shown in FIGS. 1 and 2 is completely eliminated and the engine is able to generate sufficient torque as to meet demands for acceleration and the like.

When the engine operates under low speed-high load conditions the control cams are rotated to enage the lobes 122d and 123d with the respective reaction levers. With the VVT system thus conditions the inlet valves are lifted as depicted by traces A3 and B3.

Further, when the engine operates under intermediate speed-low to intermediate load conditions the control cams are rotated to being lobes 122c and 123c into contact with the reaction levers so that the primary inlet valves 101 is lifted 8 mm while the secondary inlet valves 102 are lifted 5 mm (see traces A4, B4 of FIG. 15).

Figure 19:
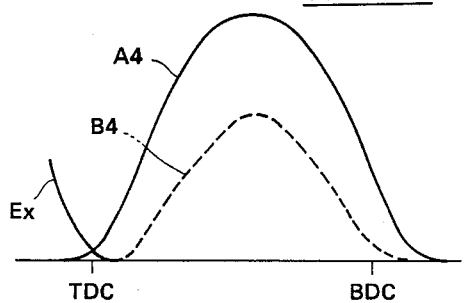
Figure 20:
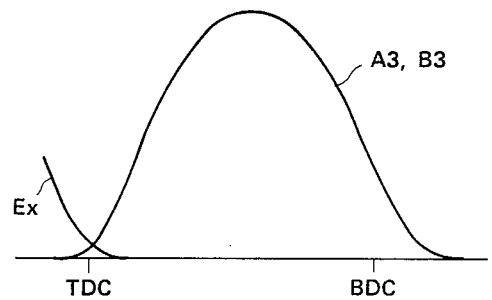
Figure 21:
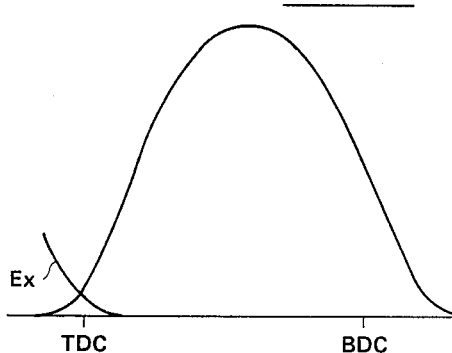
Figure 22:
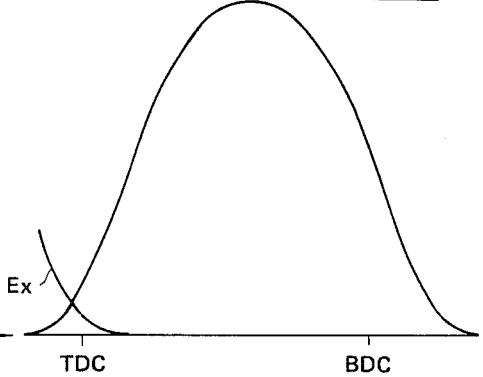

Under these conditions induction is mainly through the primary intakes 108 port and produces a strong swirl in the combustion chambers 104. At this time it is possible to form the air-fuel mixture in a manner to be leaner than stoichiometric and to recirculate large amounts of exhaust gas back into the combustion chambers (viz., use a high EGR rate). This enables good fuel economy. The reduced valve overlap which occurs under these conditions (see FIG. 19) improves exhaust characteristics.

During low speed-low load engine operation the control cams are rotated in a manner to being lobes 122b, 123b into contact with the reaction levers. This induces a primary inlet valve lift of 5 mm and a secondary valve lift of 2 mm (traces A5,B5). Due the reduced lift, the velocity of the charge inducted via the primary intake valves 101 is increased and promotes suitable swirl formation. The reduced amount of valve lift attenuates friction losses in the gear train.

Figure 17:
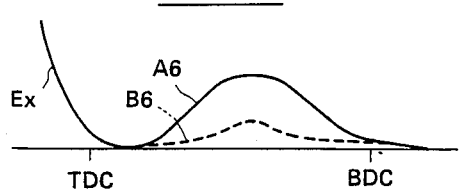
FIGS. 17 to 22 show the lift characteristics produced by the first embodiment of the present invention as the control cams shown in FIGS. 12 and 13 are rotated to each of their six operative positions.
Figure 18:
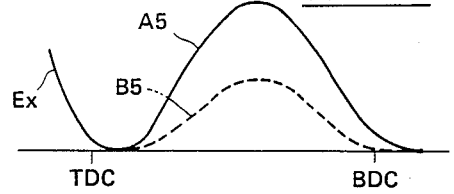

Upon the train entering an idling mode of operation the control cams are further rotated to bring lobes 122a and 123a into contact with the reaction levers and thus induce the situation wherein the primary inlet valve 101 is lifted by 2 mm and the secondary one 102 by 0.5 mm. This reduces both friction losses and the strength of the swirl produced in the combustion chambers to a suitable level. Under these conditions carburetion of the air-fuel mixture is improved and the latter is carried to the electrodes of the spark plugs 110. This tends to scavenge the electrodes the ensure that the mixture surrounding the same is a readily ignitable one and thus obviates unstable engine idling. As will appreciated from FIG. 15 (and FIG. 17) there is essentially no valve overlap under these conditions which reduces the amount of residual gas which tends to be finally retained in the combustion chambers 104.

FIGS. 17 to 22 individually illustrate each of the six valve control stages possible with the arrangement of the first embodiment. Viz., these figures illustrate the valve lift characteristics produced by the cam surfaces 122a-122f and 123-123f respectively.

It will be noted that in the event that during idling and/or during low load-load speed operation the opening of the secondary valves were not reduced and simultaneously a strong swirl was generated, poorly carburetted fuel would tend to be introduced into the combustion chambers and tend to undergo quenching at the walls of the cylinders and/or similar unstable combustion which would increase the formation of CO and HC. However, with the first emodiment of the present invention as the secondary valves 102 are prevented from opening to any extent and the strength of the swirl produced is attenuated the fuel introduced into the combustion chamber tends to be well atomized and quenching and/or harsh combustion is prevented.

Figure 24:
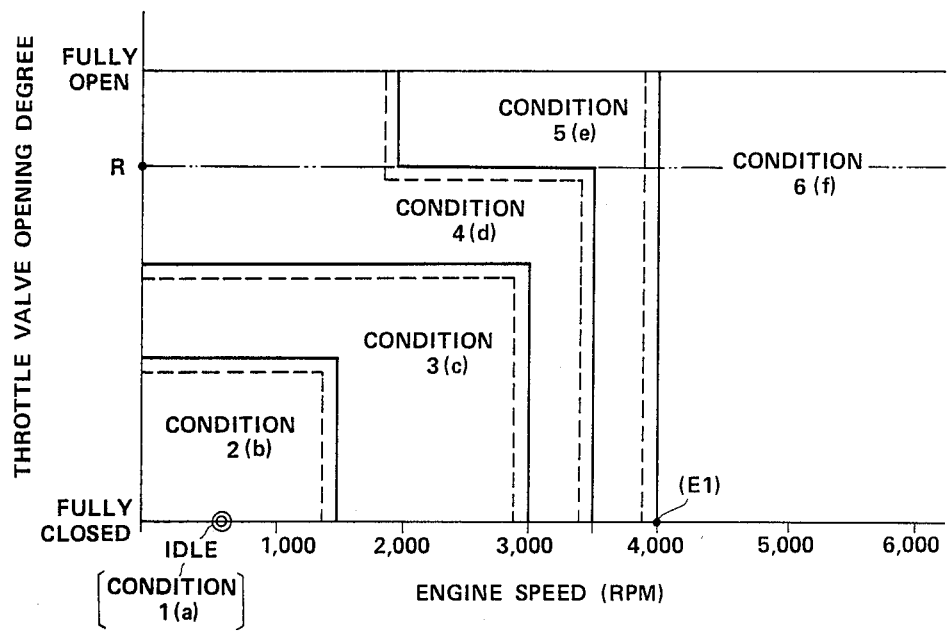
FIG. 24 is a chart depicting in terms of engine throttle opening (engine load) and engine speed, the various operational zones involved with the control of the first embodiment of the present invention.

It will be further noted that in high speed operational zones wherein the throttle valve is opened to or beyond the point "R" shown in FIG. 24 for example, the amount of induction is relatively high and the mixing of the flows entering the combustion chambers through the primary and secondary induction ports tends to produce strong turbulence therein. Under these conditions it is preferred in the first embodiment to operate the primary and secondary inlet valves 101, 102 with essentially the same timing and lift—see FIGS. 20 to 22. This obviates the generation of undesirably loud combustion noise which tends to be produced when the lift and timing are different and the primary and second induction flows produce excessively strong turbulence.

Figure 23:
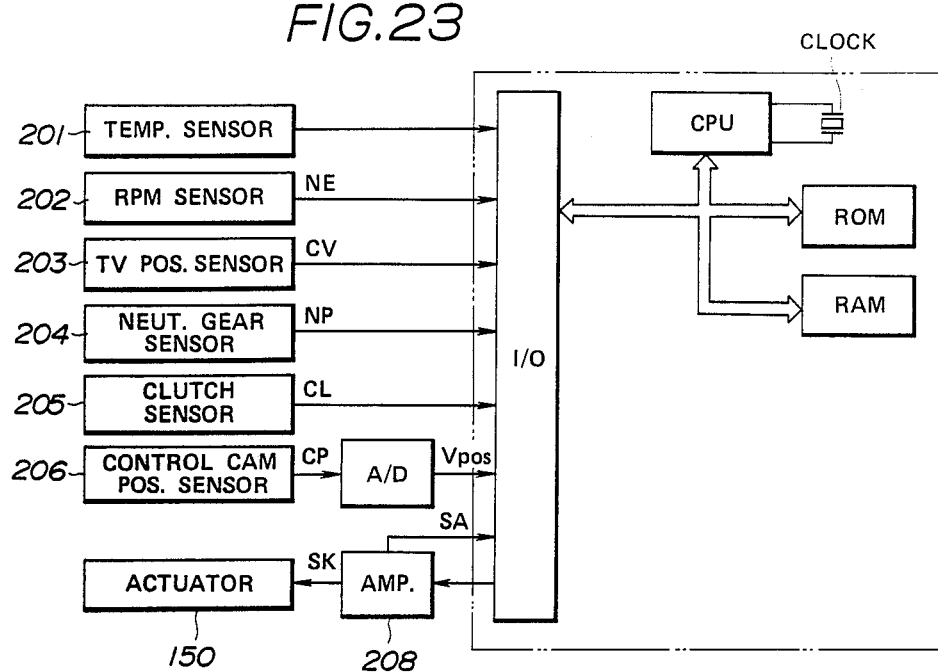
FIG. 23 shows in schematic block diagram form a sensor and control arrangement by which the control cam arrangement shown in FIGS. 6 to 13 is controlled.

FIG. 23 shows in schematic form a sensor/control arrangement via which the first embodiment of the present invention is controlled. As shown, this arrangement includes a microprocessor which includes a CPU, a ROM, a RAM a clock (circuit) and an I/O board.

A plurality of sensors which include an engine coolant temperature sensor 201; an engine speed sensor 202; a throttle position sensor 203 (engine load sensor); a transmission status sensor 204 which senses whether or not the transmission is in neutral gear or not; a clutch status sensor 205 which issues a signal indicative of the clutch which interconnects the engine with the transmission being conditioned to transmit torque between said devices (it will be noted that although for simplicity of disclosure it will be assumed that the clutch is of the type used in manual transmissions, it is possible to use a suitable arrangement which can detect the corresponding status of a torque converter or the like the event that the engine to which the invention is applied to connected to an automatic transmission) and a control cam position sensor 206; supply data indicative of the instant set of operating conditions. In this embodiment sensors 201 to 205 are arranged to output a digital signal directly to the I/O board while the cam position sensor 206 produces an analog signal CP which A/D converted to form a digital signal Vpos.

It will be noted that in place of throttle opening it is alternatively possible to measure the amount of air beng inducted into the engine or the induction vacuum as a means of determining the load on the engine.

The actuator (stepping motor) 150 is fed a drive signal SK from an amplifier or like circuit 208. This circuit is controlled by an output from the I/O board and produces a feedback type signal SA which indicates nonoperation of the device. In response to the various inputs the microcomputer controls the operation of the stepping motor 150 in a manner to ensure that control cams are rotated to the appropriate position for the given set of operating conditions.

FIG. 24 shows a control schedule which is tabled in terms of throttle valve opening (engine load) and engine speed (RPM). In this table the solid lines which divide the various operational zones (conditions) are such as to denote the shift line at which control is shifted from that suited to one operational condition to that suited for the next when the load or speed or the engine is increasing, while the broken lines denote the situation wherein a shift from one mode to the next is made when the magnitude of the load or engine speed is reducing. This endows hysteresis on the system which obivates the undesirable phenomenon wherein the control cams are rapidly switched back and forth or "hunt" from one position to another.

Condition 1 of this control schedule is defined at point denoted by IDLE and occurs when the load on the engine is minimal and the engine speed is approximately 500 RPM. Subsequent operational zones "condition 2"-"condition 6" are defined as shown. The corresponding lobes (a-f) of the control cams which are used during each of these modes is shown in brackets.

When the inputs of the various sensors indicate that the engine is idling (is operating under condition 1) the air-fuel mixture fed to the engine under such conditions is controlled to stoichiometric. However, upon the engine changing from condition 1 to condition 2 the air-fuel mixture is either leaned to one having an A/F greater than 20:1 or maintained at or just below stoichiometric and blended with a large amount of EGR gas. This, in combination with the previously described valve timing produced by the control cam lobes 122b and 123b reduces the formation of NOx while maintaining good fuel economy.

In order to induce the engine to produce large amounts of power it is possible to provide a throttle position switch which is triggered when the throttle is opened to point "R". The air-fuel mixture control arrangement (not shown) of the engine can be made responsive to the output of this switch to feed the engine a mixture which is richer than stoichiometric irrespective of the instant mode of engine operation.

In zones outside of condition 1 and below level R it is possible to arrange for the engine to be fed a mixture having an air-fuel ratio equal to or slightly lower than stoichiometric so as to ensure that the required amount of engine output is achieved and to prevent any shock which might occur if the air-fuel ratio of the mixture fed to the engine were suddently changed from rich to lean or vice versa due to large transitions in operation mode.

Figure 25:
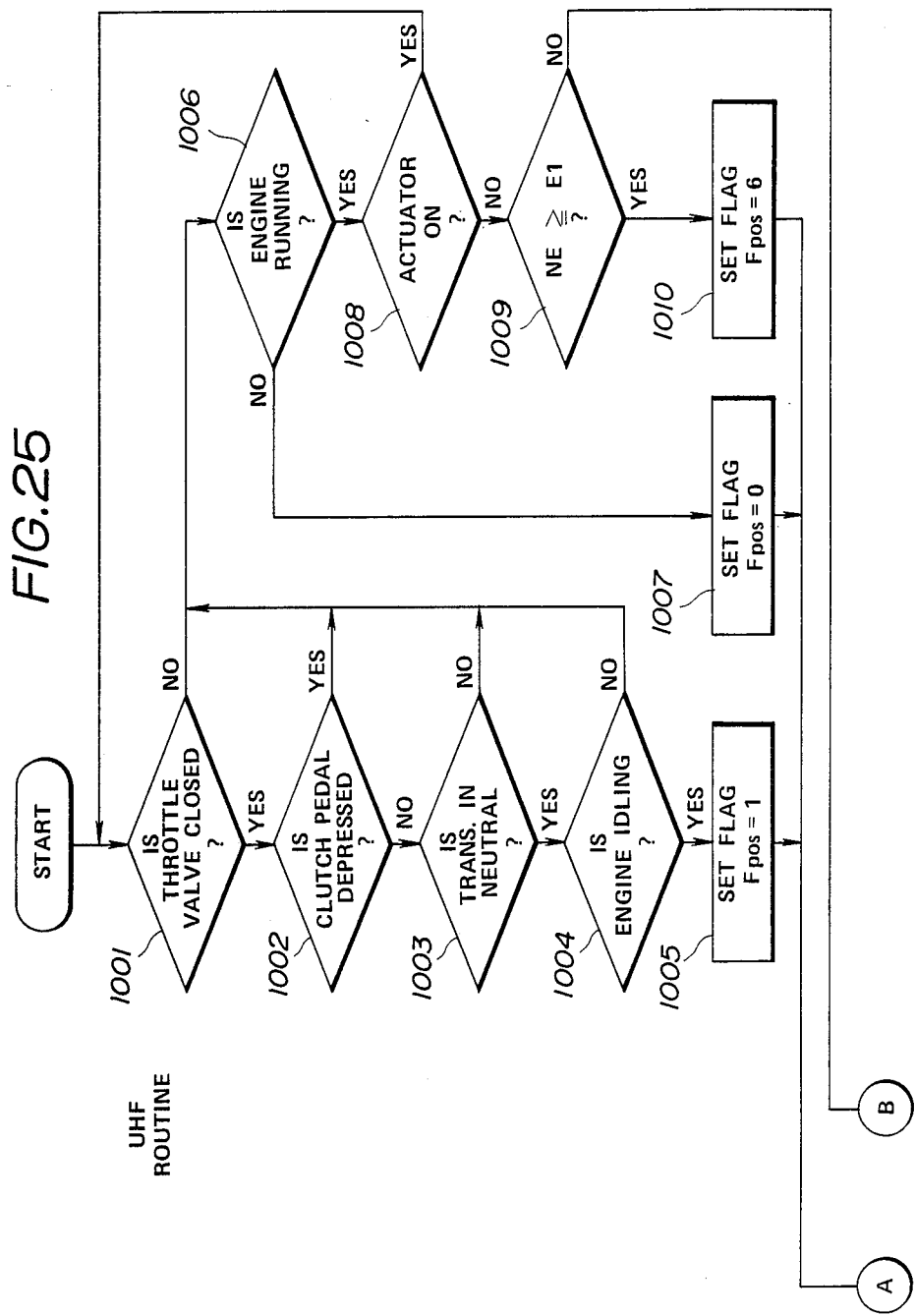
FIGS. 25 to 27 show in flow chart form the control steps which are implemented in order to achieve appropriate operation of the valve train of the first embodiment.
Figure 26:
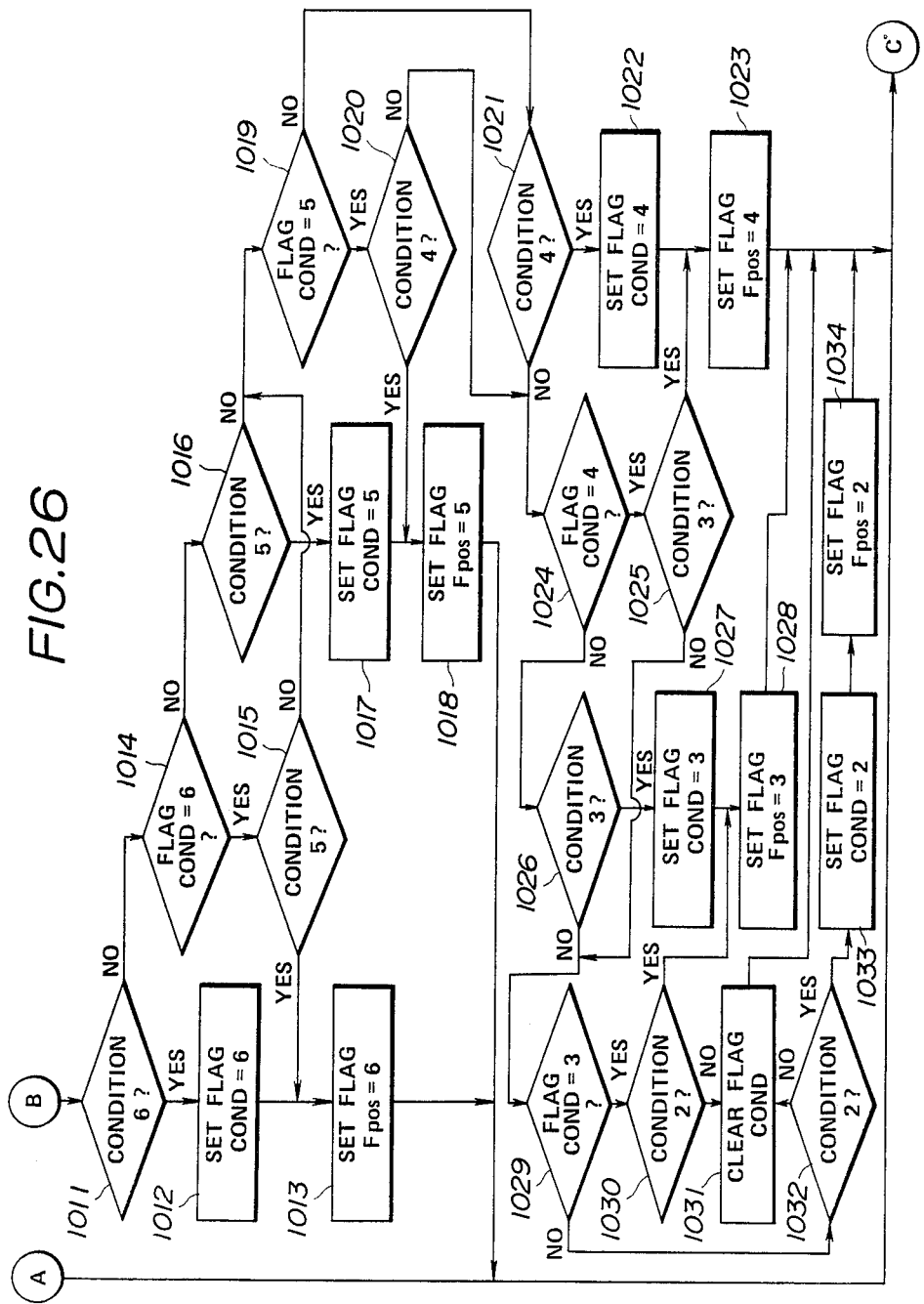
Figure 27:
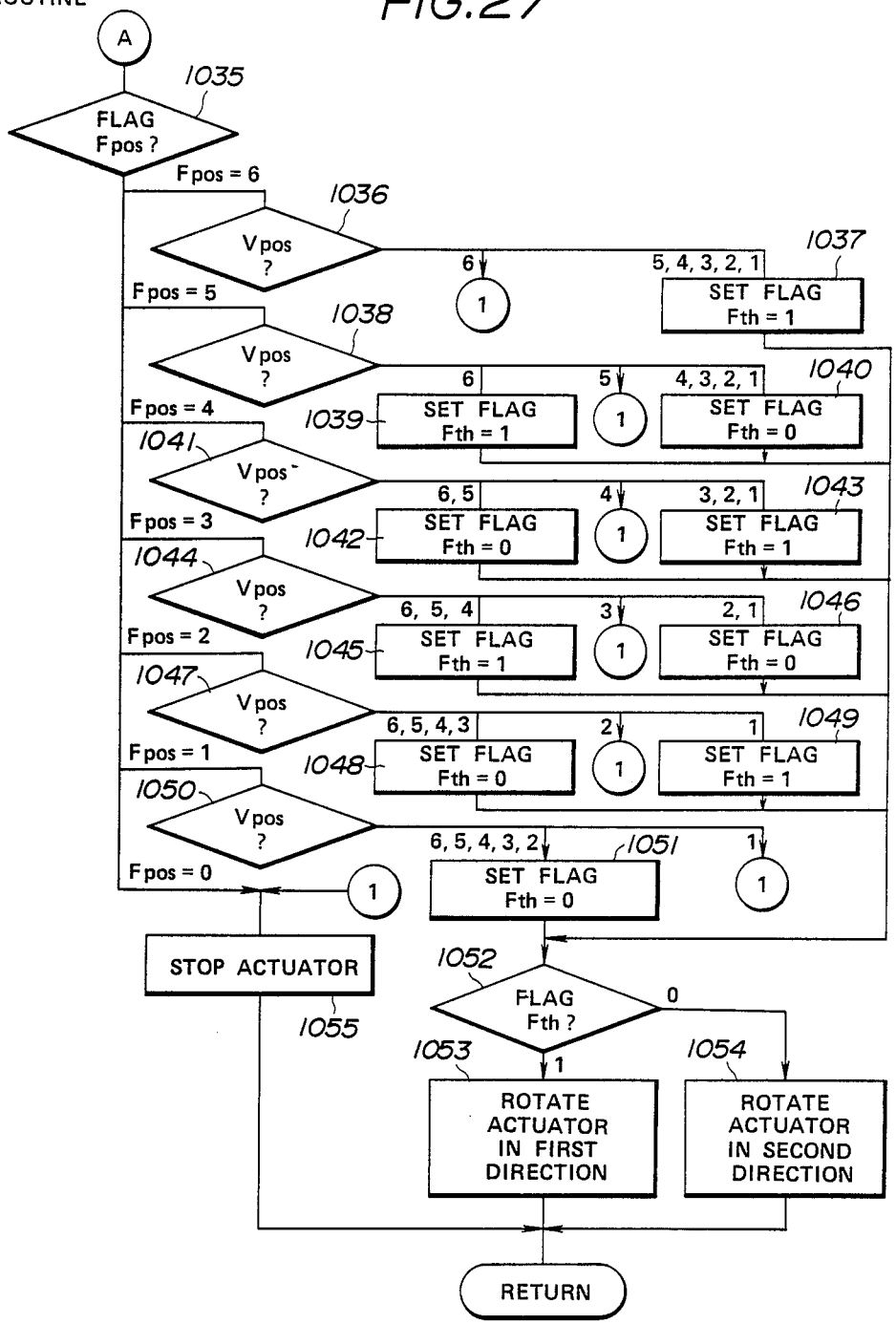

FIGS. 25 to 27 show a flow chart which depicts the processing steps which are carried out in order to appropriately control the first embodiment of the present invention.

As shown following the start of the control program the current status of the engine load is determined by sampling the position of the engine throttle valve. If the outcome of this enquiry indicates that the TV (throttle valve) is closed then the program flows to step 1002 wherein it is determined if there is a demand to transmit torque from the engine to the transmission by sampling the output of the clutch status sensor 205. If the answer to this enquiry is such as to indicate that the clutch pedal is depressed (viz., there is no demand for torque transmission) then the program goes to step 1003 wherein it is determined if the transmission is in a neutral gear or not.

At step 1004 the engine speed is sampled and a determination made as to whether the engine is idling or not.

As shown, if the outcome of steps 1001 to 1004 indicates that there is no intention of driving the vehicle and that for the moment the engine is to be left idling then at step 1005 a flag Fpos is set to "1" and the program flows on to the KSF routine shown in FIG. 27. On the other hand, if the outcome of the any of the steps 1001 to 1004 indicate the possibility that there is or will shortly be a demand for engine output then the program flows across to step 1006 wherein it is determined if the engine is in fact running. If not, then at step flag Fpos is set to zero at step 1007 and the program goes on to the KSF routine.

However, if the engine is running then at step 1008 it is determined if the stepping motor 150 is currently being operated. If the motor is in fact currently in use the program recycles to step 1001 to permit the completion of the instant phase of operation. This completion is indicated by the generation of signal SA.

When the operation is completed the program goes to step 1009 wherein the current engine speed is sampled and a determination made to ascertain whether the engine speed is equal to or above a predetermined value E1 or not. In this instance the value is selected to be 4000 RPM. If the engine speed is equal to or greater than E1 then at step 1010 flag Fpos is set to 6 and the program then flows to section KSF (FIG. 27).

However, if a value lower than E1 is detected then the program flows to step 1011 wherein it is determined if the engine is operating under condition 6 or not. This condition may be detected by way of example by sampling the output of the engine speed sensor and the output of the engine load sensor (throttle valve position sensor) and performing a table look-up where data of the nature shown in FIG. 24 is logged in ROM. At this step is should be noted whether either one or both of the variables is increasing or decreasing to enable the appropriate shift control decision to be made.

If for example, the co-ordinate which corresponds to the instant engine speed and load falls in the zone which defines condition 6 operation then the program flows to step 1012 wherein a flag COND is set to have a value of 6. Following this at step 1013 a flag Fpos is set to have a value of 6. The program then flows to the KSF routine.

However, in the event that the outcome of the enquiry at step 1011 indicates that the engine is operating in a zone other than condition 6 then at step 1014 it is determined if the current status of flag COND is 6 or not. If the outcome is positive then at step 1015 an enquiry is made to determine if the engine is operating in the next lower zone (viz., condition 5). If the outcome of this enquiry indicates that the engine in fact is operating in the condition 5 zone then the program flows across to step 1013 and then on to KSF routine. However, in the event that the outcome of this enquiry is negative then the prgram flows across to step 1019 wherein the status of the COND flag is checked.

As will be apparent, steps 1016 to 1020, 1021 to 1025 and 1026 to 1031 are essentially repetitions of steps 1011 to 1015 with the exception that the value of the condition determined is incrementally reduced by one per stage. Steps 1032 to 1034 essentially parallel steps 1011 to 1013. However, step 1031 is such as to clear flag COND.

As will be appreciated steps 1011 to 1034 are such as to rapidly update the flags involved when the engine is operating in a manner wherein the engine operational mode value is increasing (viz., moving from condition 1 toward condition 6) but slows the flag changing when the value is decreasing.

The KSF routine is such as to compare the instant F pos flag status with the output of the signal Vpos fed to the I/O board from the control cam position sensor (via the A/D converter). If the position signal and the Fpos flag values coincide then the program flows directly to step 1054 wherein a command to terminate further stepping motor operation is issued. On the other hand flag Fth is set in steps 1037 to 1051 to a value of "0" or "1" depending on the direction in which it is necessary to rotate the cam under the instant set of conditions.

Figure 28:
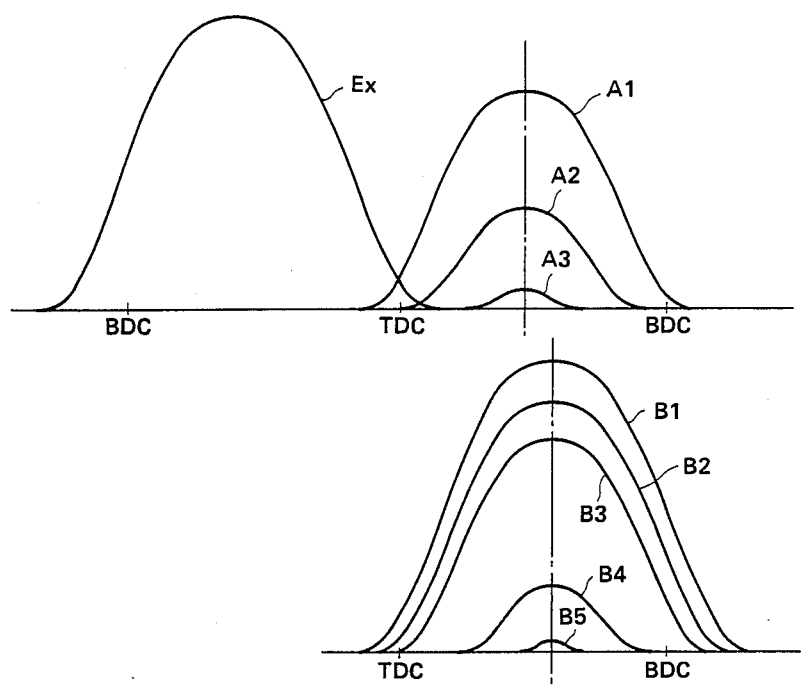
FIG. 28 is a graph showing the valve lift characteristics provided by a second embodiment of the present invention.
Figure 29:
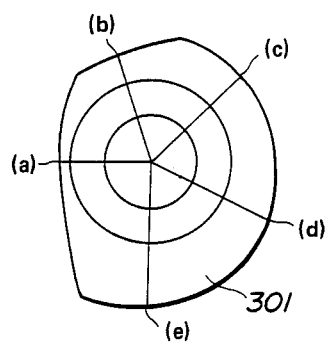
FIGS. 29 and 30 show the profiles of the two five lobe control cams which are employed in the second embodiment to control the primary and secondary primary inlet valves respectively.
Figure 30:
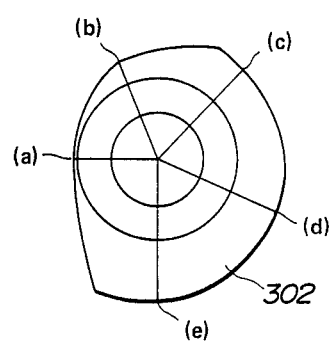
Figure 34:
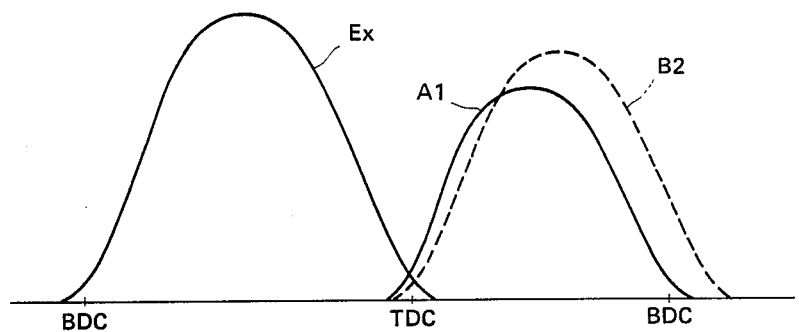
Figure 35:
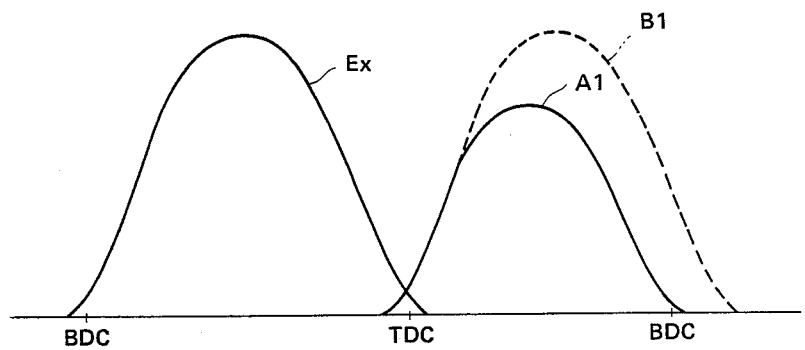

FIG. 28 shows in graphical form the valve lift characteristics provided by a second embodiment of the present invention. In this emboidment the control cams of the primary and secondary inlet valves are formed with 5 lobes each as shown in FIGS. 29 and 30 respectively. The embodiment features that the timing with which the maximum lift of the primary inlet valves occur and that with which the secondary inlet valves undergo maximum lift are shifted in a manner that the maxium lift of the secondary valves occurs later than that of the primary ones.

With the second embodiment the primary lift valve is arranged to be controllable to three levels while the secondary valve is controllable to five. This is achieved by arranging the lobes c, d and e of cam 301 to produce the same lift.

FIGS. 31 to 35 show individually the lift characteristics produces as the two control cams are rotated through their five operative positions.

Figure 36:
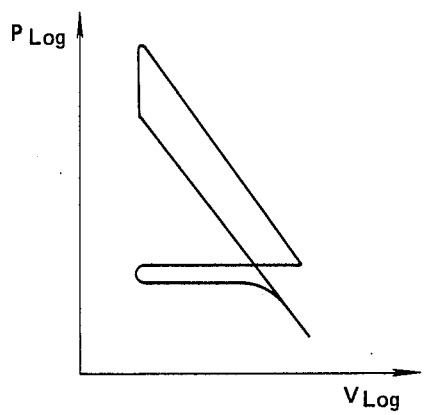
FIG. 36 shows in terms of Log P and Log V (wherein P and V represent pressure and volume respectively) the reduction in pumping loss possible with the second embodiment of the present invention at low engine speeds.

As will be appreciated from FIG. 31 the lift of the primary and secondary valve is very small and such that opening occurs after TDC and with no overlap with the exhaust valve. The closure of the valves also occurs before BDC. With this timing the vacuum prevailing in the induction manifold downstream of the throttle valve is prevented from inducing exhaust gases in the exhaust system from flowing back into the combustion chambers and thus reduces the amount of residual gas therein. Further the early closure timing and low lift results in reduced pumping loss as will be evident from the P-V diagram of FIG. 36.

When the engine operation changed from idling to low speed-low load operation (e.g. changes from condition 1 to condition 2) the timing of the primary and secondary valves is such that the peaks of the respective lifts approach each other. Viz., as shown in FIG. 31 the peak of the secondary valve lift occurs at a timing which is close to the closure timing of the primary valve, while as shown in FIG. 32 upon the shift from condition 1 to condition 2 the peak lift of the secondary valve occurs just after the peak lift of the primary one. Subsequent operation under the control of the c lobes of the control cams is such as to induce the situation wherein the lift of the secondary valve begins to peak just as the peak of the primary one is finishing.

Further, as will be apprent from FIG. 32 the lift of the primary inlet valve is such as to terminate before BDC while initiating immediately after TDC with a small overlap with the exhaust valve. The increased lift increases the induction volume and increases the amount of torque produced by the engine.

The application of the d lobes of the control cams 301, 302 increases the induction volume and valve overlap with the result that increased torque is produced and induction blowback prevented.

Upon entering high speed-high load operation the lift provided by the e lobes initiate the opening of the secondary valves at a point essentially synchronous with that of the primary ones. Increased induction volume results in increased engine power output.

Figure 37:
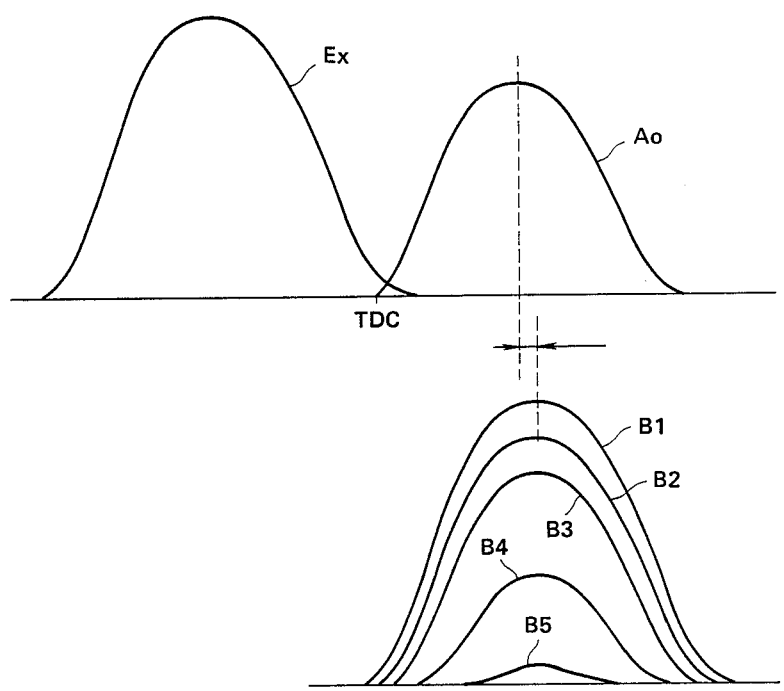
FIG. 37 shows in graphical form the valve lift characteristics which are provided with a third embodiment of the present invention.

FIG. 37 shows the valve timing which characterizes a third embodiment of the present invention. As will be appreciated this embodiment is such that the timing and lift of the primary inlet valve is fixed and only the timing of the secondary valve is varied. The maximum lift of the primary inlet valve is less than that produced in the first and second embodiments.

Figure 38:
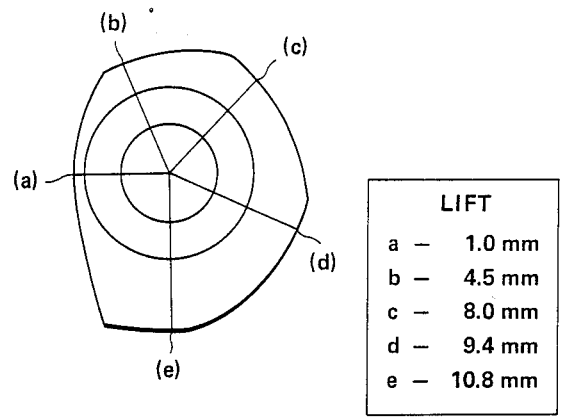
FIG. 38 shows the profile of the single five lobe control cam employed in the third embodiment.
Figure 39:
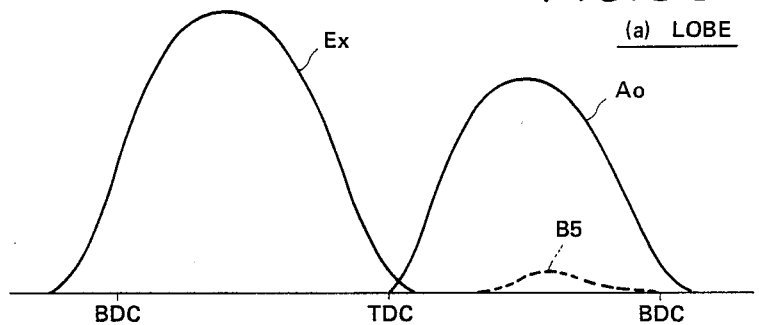
FIGS. 39 to 43 show indivdually the lift characteristics which are produced as the single control cam of the third embodiment is rotated through its five operative positions.
Figure 40:
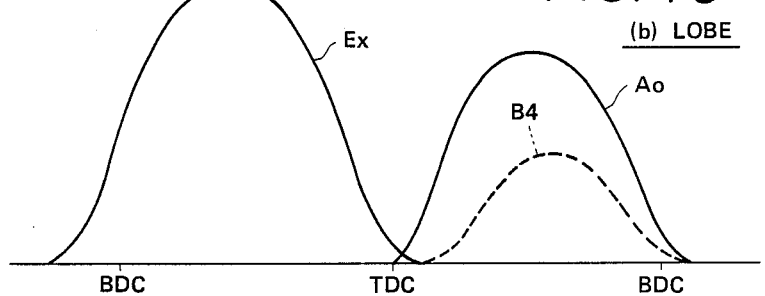
Figure 41:
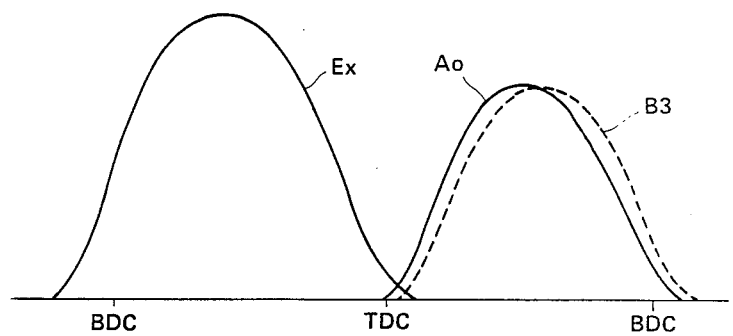
Figure 42:
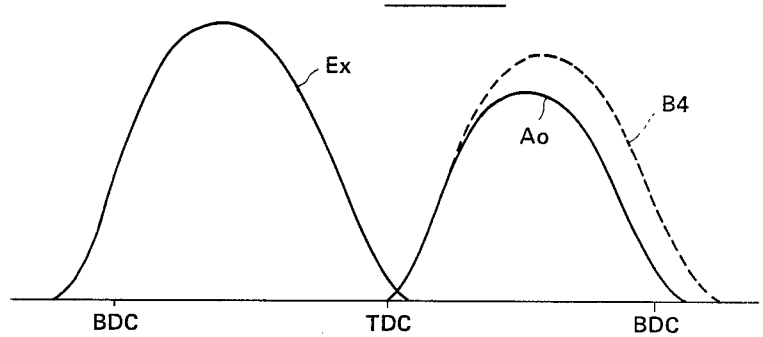
Figure 43:
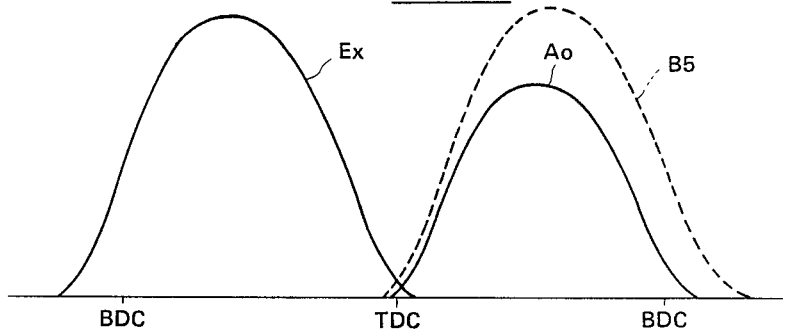

FIG. 38 shows the profile of the single control cam employed in this embodiment. FIGS. 39 to 43 denote the lift characteristics derived as the single control cam 402 is rotated through its five operative positions.

In this embodiment it is possible to operate the exhaust valve and the primary inlet valve using a rocker arm arrangement such as shown in FIG. 14 and use an arrrangement such as disclosed in FIG. 6 to operate the secondary inlet valve.

With the third embodiment pumping loss and fouling of the spark plug are attenuated and stable operation promoted during low speed operation particularly when the temperature of the engine is low.

An advantageous feature common to all three of the above described embodiments comes in that the arrangement via which the air-fuel mixutre is formed can be notably simplified as compared with the arrangement of the prior art shown and discussed in connection with in FIGS. 1 to 5.

It will be noted that the present invention is not limited to the lift values quoted in the drawings and specification and that these are given merely by way of example.

What is claimed is:

1. In an internal combustion engine
means defining a combustion chamber;
an exhaust valve which controls communication between said combustion chamber and an exhaust systems;
a first inlet valve which controls communication between said combustion chamber and a first induction passage which is so constructed and arranged as to guide the air which flows therethrough into the combustion chamber in a manner to establish a swirling air pattern therein;
a second inlet valve which controls communication between said combustion chamber and a second induction passage which is so constructed and arranged as to introduce the air flowing therein into the combustion chamber in a manner which promotes charging efficiency;
a first variable valve timing arrangement which controls the lift and timing of said second inlet valve;
a control device for controlling said first variable valve timing arrangement in response to a first operational parameter of said engine;
wherein said control arrangement is responsive to a second operational parameter, wherein said first and second operational parameters are the rotational speed of said engine and the load on said engine and which comprises first and second sensors for sensing the magnitude of said first and second operational parameters and producing signals indicative thereof; and
a second variable valve timing arrangement which controls the lift and timing of said first inlet valve, said second variable valve timing arrangement being responsive to said control device.

2. An internal combustion engine as claimed in claim 1, wherein said first variable valve timing arrangement includes:
a first rocker arm a first end of which engages a stem of said second inlet valve;
a first continously rotatable cam which engages a second end of said first rocker arm;
a first reaction lever which is pivotally mounted at one end and arranged to engage said first rocker arm in a manner that when a lobe of said first cam engages said second end in a manner to displace the same, said first rocker arm moves toward and reacts against said reaction lever in a manner which causes said rocker arm to pivot and lift said second inlet valve;
a first control cam which is selectively rotatable to a plurality of positions, said first control cam engaging said first reaction lever at a site distal from said one end at which it is pivotally mounted; said first control cam varying the orientation of said first reaction lever in a manner which varies the lifting of said second valve.

3. An internal combustion engine as claimed in claim 2, wherein said control device comprises:
a motor;
a control shaft operatively connected with said motor, said first control cam being disposed on said drive shaft and operatively connected therewith in a manner to be driven by the same upon said motor being energized, said operative connection including:
resilient means which enables a limited amount of rotation of between said control shaft and said first control cam which limited amount of rotation establishes a bias which tends to rotate said first control cam toward its next operative position; and
a lost motion connection which positively connnects said control shaft and said first control cam after said control shaft has rotated by a predetermined amount with respect thereto.

4. An internal combustion engine as claimed in claim 3, wherein said control arrangement further comprises:
means including a control schedule which is defined in terms of said first and second parameters and which is divided into a plurality of operational zones,
said means being responsive to:
(a) a transition of engine operation from one zone to another which transition is induced by an increase in the magnitude of one or both of said first and second parameters, so as to promptly energize said motor in a manner which rotates said first control cam in a rotational direction which increases the lift of said second inlet valve; and
(b) a transition from one operational zone to another which is induced by a reduction in the magnitude of one or both of said first and second parameters in a manner to delay the energization of said motor in a manner which rotates said first control cam in a rotational direction which decreases the lift of said second inlet valve.

5. An internal combustion engine as claimed in claim 4, wherein said second variable valve timing arrangement includes:
a second rocker arm a first end of which enagages a stem of said first inlet valve;

a second continously rotatable cam which engages a second end of said second rocker arm;

a second reaction lever which is pivotally mounted at one end and arranged to engage said second rocker arm so that when a lobe of said second cam engages the second end of said second rocker arm in a manner to displace the same, said second rocker arm moves toward and reacts against said second reaction lever in a manner which causes said second rocker arm to pivot and lift said first inlet valve;

a second control cam which is selectively rotatable to a plurality of positions, said second control cam engaging said second reaction lever at a site distal from said one end at which it is pivotally mounted; said second control cam varying the orientation of said second reaction lever in a manner which varies the lifting of said first valve.

6. An internal combustion engine as claimed in claim 5, wherein said control device comprises:
a motor;
a control shaft operatively connected with said motor, said first and second control cams being disposed on said drive shaft and operatively connected therewith in a manner to be driven by the same upon said motor being energized, said operative connection including:
resilient means which enables a limited amount of rotation of between said control shaft and each of said first and second control cams which limited amount of rotation establishes a bias which tends to rotate said first and second control cams, and
lost motion connections which positively connects said control shaft and said first and second control cams after said control shaft has rotated by a predetermined amount with respect thereto.

7. An internal combustion engine as claimed in claim 6, wherein said control arrangement further comprises:
means including a control schedule which is defined in terms of said first and second parameters and which is divided into a plurality of operational zones,
said means being responsive to:
(a) a transition of engine operation from one zone to another which transition is induced by an increase in the magnitude of one or both of said first and second parameters so as to promptly energize said motor in a manner which rotates said first and second control cams in a rotational direction which increases the lift of said second and first inlet valves; and
(b) a transition from one operational zone to another which is induced by a reduction in the magnitude of one or both of said first and second parameters so as to delay the energization of said motor in a manner which rotates said first and second control cams in a rotational direction which decreases the lift of said second and first inlet valves.

8. An internal combustion engine as claimed in claim 5, wherein said first and second control cams are arranged so that said first control cam induces the maximum lift of said second inlet valve at a timing which is later than the timing with which said second control cam induces the maximum lift of said first inlet valve.

9. A method of controlling an internal combustion engine comprising the steps of:

controlling the communication between a combustion chamber of the engine and an exhaust system thereof using an exhaust valve;
using a first inlet valve to control communication between said combustion chamber and a first induction passage;
arranging the first induction passage to guide the air which flows therethrough into the combustion chamber in a manner to establish a swirling air pattern therein;
using a second inlet valve to control communication between said combustion chamber and a second induction passage;
arranging said second induction passage to introduce the air flowing therein into the combustion chamber in a manner which promotes charging efficiency;
controlling said second inlet valve using a first variable valve timing arrangement which controls the lift and timing of said second inlet valve;
using a control device to control said first variable valve timing arrangement in accordance with a first operational parameter of said engine;
using first and second sensors to sense the magnitude of said first and a second operational parameter;
defining said first and second operational parameters as being the rotational speed of said engine and the load on said engine;
controlling said first variable valve timing arrangement using a control schedule which is defined in terms of said first and second parameters and which is divided into a plurality of operational zones;
controlling the operation of a motor which controls a first control cam of said first variable valve timing arrangement in response to a transition of engine operation from one zone to another which transition is induced by an increase in the magnitude of one or both of said first and second parameters so as to promptly energize said motor in a manner which rotates said first control cam in a rotational direction which increases the lift of said second inlet valve, and
controlling the operation of said motor in response to a transition from one operational zone to another which is induced by a reduction in the magnitude of one or both of said first and second parameters so as to delay the energization of said motor in a manner which rotates said first control cam in a rotational direction which decreases the lift of said second inlet valve.

10. A method of controlling an internal combustion engine comprising the steps of:
controlling the communication between a combustion chamber of the engine and an exhaust system thereof using an exhaust valve;
using a first inlet valve to control communication between said combustion chamber and a first induction passage;
arranging the first induction passage to guide the air which flows therethrough into the combustion chamber in a manner to establish a swirling air pattern therein;
using a second inlet valve to control communication between said combustion chamber and a second induction passage;
arranging said second induction passage to introduce the air flowing therein into the combustion chamber in a manner which promotes charging efficiency;

controlling said second inlet valve using a first variable valve timing arrangement which controls the lift and timing of said second inlet valve;

using a control device to control said first variable valve timing arrangement in accordance with a first operational parameter of said engine;

using first and second sensors to sense the magnitude of said first and a second operational parameter;

defining said first and second operational parameters as being the rotational speed of said engine and the load on said engine;

using a second variable valve timing arrangement to control the lift and timing of said first inlet valve, said second variable valve timing arrangement being responsive to said control device.

11. A method as claimed in claim 10, further comprising the steps of:

controlling said first and second variable valve timing devices using a control schedule which is defined in terms of said first and second parameters and which is divided into a plurality of operational zones, controlling the operation of a motor which controls first and second control cams of said first and second varible valve timing arrangements in response to a transition of engine operation from one zone to another which transition is induced by an increase in the magnitude of one or both of said first and second parameters so as to promptly energize said motor in a manner which rotates said first and second control cams in a rotational direction which increases the lift of said second and first inlet valves, and controlling the operation of said motor in response to a transition from one operational zone to another which is induced by a reduction in the magnitude of one or both of said first and second parameters so as to delay the energization of said motor in a manner which rotates said first and second control cams in a rotational direction which decreases the lift of said second and first inlet valves.

12. A method as claimed in claim 10, further comprising the step of arranging said first and second variable valve timing arrangements so that the maximum lift of said second inlet valve occurs a timing later than that of said first inlet valve.

13. In a multi-cylinder internal combustion engine a plurality of combustion chambers, each of said combustion chambers having first and second inlet valves and an exhaust valve;

a cam shaft on which inlet valve and exhaust valve cams are mounted;

a plurality of first variable valve timing devices, each of said first VVT devices being associated with a first inlet valve;

a plurality of second variable valve timing devices, each of said second VVT devices being associated with a second inlet valve;

a plurality of first control cams, each of said first control cams being associated with one of said plurality of said first variable valve timing devices;

a plurality of second control cams, each of said second control cams being associated with one of said plurality of said second variable valve timing devices;

a control cam shaft on which said plurality of first and second control cams are operatively disposed; and means responsive to engine operational parameters for rotating said control cam shaft in a manner wherein the valve lift induced by said first and second variable valve timing devices increases quickly toward a maximum value when the load on the engine is increasing and decreases less quickly toward a minimum value when the load on the engine is decreasing.

14. A multi-cylinder internal combustion engine as claimed in claim 13 wherein each of said first and second control cams are connected to said control cam shaft via a resilient member, each resilient member permitting said control cam shaft to rotate with respect to the associated control cam in a manner which tensions the resilient member and applies a bias to the associated control cam, said bias tending to rotate the associated control cam same until such time as the lifting operation of the associated inlet valve has finished and the cam is permitted to rotate to a new position.

* * * * *